United States Patent
Bouche et al.

(10) Patent No.: US 10,611,571 B2
(45) Date of Patent: Apr. 7, 2020

(54) PICKING DEVICE IN THE FORM OF A ROTARY TABLE

(71) Applicant: KARDEX PRODUKTION DEUTSCHLAND GMBH, Neuburg/Kammel (DE)

(72) Inventors: Norbert Bouche, Landau (DE); Jurgen Schnatterer, Pfinztal (DE); Christoph Speyerer, Insheim (DE)

(73) Assignee: Kardex Produktion Deutschland GmbH, Neuburg/Kammel (DE)

( * ) Notice: Subject to any disclaimer, the term of this patent is extended or adjusted under 35 U.S.C. 154(b) by 0 days.

(21) Appl. No.: 15/540,116

(22) PCT Filed: Jan. 28, 2016

(86) PCT No.: PCT/EP2016/051790
§ 371 (c)(1),
(2) Date: Jun. 27, 2017

(87) PCT Pub. No.: WO2016/120375
PCT Pub. Date: Aug. 4, 2016

(65) Prior Publication Data
US 2017/0369247 A1    Dec. 28, 2017

(30) Foreign Application Priority Data
Jan. 29, 2015   (DE) .................. 10 2015 201 565

(51) Int. Cl.
*B65G 1/137* (2006.01)
*B65G 47/53* (2006.01)
(Continued)

(52) U.S. Cl.
CPC ........... *B65G 1/1378* (2013.01); *B65G 29/02* (2013.01); *B65G 47/53* (2013.01); *B65G 47/80* (2013.01);
(Continued)

(58) Field of Classification Search
CPC ................... B65G 47/80; B65G 47/962
See application file for complete search history.

(56) References Cited

U.S. PATENT DOCUMENTS 2,760,620 A * 8/1956 Hull ..................... B65B 43/50
                                                                  198/478.1
4,003,461 A    1/1977 Speaker et al.
(Continued)

FOREIGN PATENT DOCUMENTS

| CN | 1503712 | 6/2004 |
|---|---|---|
| CN | 1809428 | 7/2006 |

(Continued)

OTHER PUBLICATIONS

International Search Report from related PCT application No. PCT/EP2016/051790, dated May 9, 2016.
(Continued)

*Primary Examiner* — William R Harp
(74) *Attorney, Agent, or Firm* — Barnes & Thornburg LLP; Jeffrey R. Stone

(57) ABSTRACT

The invention relates to a picking device for arranging between at least one automatic placement point and at least one picking workstation, comprising at least one container holder movable along a travel path from the picking workstation to the placement point, and comprising a rotation unit for moving the at least one container holder along the travel path. The invention further relates to a storage system, which enables a fast picking of goods and simultaneously increases safety and ergonomics for an operator, the picking device has a tilt device for the at least one container holder by means of which the at least one container holder can be tilted toward the at least one picking workstation during a movement along the travel path.

12 Claims, 4 Drawing Sheets

(51) Int. Cl.
B65G 47/80 (2006.01)
B65G 29/02 (2006.01)
B65G 29/00 (2006.01)

(52) U.S. Cl.
CPC ...... *B65G 29/00* (2013.01); *B65G 2201/0258* (2013.01); *B65G 2207/40* (2013.01); *B65G 2209/08* (2013.01)

(56) References Cited

U.S. PATENT DOCUMENTS

| | | | |
|---|---|---|---|
| 4,031,998 A | 6/1977 | Suzuki et al. | |
| 4,883,401 A * | 11/1989 | Kavieff | B65G 1/0485 414/273 |
| 6,854,815 B1 | 2/2005 | Smith | |
| 7,527,139 B2 * | 5/2009 | Hasenfratz | B65G 1/0435 198/347.2 |
| 9,220,356 B2 * | 12/2015 | Hognaland | B65G 1/133 |
| 2014/0288696 A1 | 9/2014 | Lert | |

FOREIGN PATENT DOCUMENTS

| | | |
|---|---|---|
| CN | 1867502 | 11/2006 |
| DE | 3929724 | 4/1990 |
| DE | 202004010221 | 8/2004 |
| DE | 102013210196 | 12/2014 |
| JP | 2001002239 | 1/2001 |
| WO | 2004/069433 | 8/2004 |
| WO | 2005/016796 | 2/2005 |
| WO | 2012/026824 | 3/2012 |

OTHER PUBLICATIONS

Search report issued by the Chinese Patent Office in related application No. 2016800076760 and dated Jul. 25, 2018.

* cited by examiner

PICKING DEVICE IN THE FORM OF A ROTARY TABLE

The invention relates to a picking device for arranging between at least one automatic placement point and at least one picking workstation, comprising one container holder movable along a travel path from the picking workstation to the placement point, and comprising a rotation unit for moving the at least one container holder along the travel path.

BACKGROUND OF THE INVENTION

Picking devices are known in the prior art. They may serve to move a container holder from a placement point to a picking workstation and back. The automatic placement point may be part of an automatic storage system or connected to it. The picking workstation may serve to access the container holder or a container held therein by at least one operator or by a further automatic system. In order to allow a rapid movement of the at least one container holder between the placement point and the picking workstation, picking devices can have rotation units, which can move at least one container holder by a rotary movement between the placement point and the picking workstation. For example, DE 39 29 274 C2 shows an article storage and output device with a rotary table. The rotary table allows a rapid transport between a storage and removal machine and a removal station. However, it is disadvantageous that the access by an operator to the content of the containers is cumbersome, which may cause long picking times and, in case of prolonged operation, possibly result in damage to health.

BRIEF SUMMARY OF THE INVENTION

It is therefore an objection of the invention to provide a picking device of the above mentioned type, which allows an easy access at least at one picking workstation to the at least one container holder or to a container held in the at least one container holder and, thereby, minimizing health risks for an operator and allowing a faster access to the at least one container holder.

This object is attained for a picking device of the type initially mentioned due to the fact that the picking device has a tilt device for the at least one container holder by means of which the at least one container holder can be tilted toward the at least one picking workstation during a movement along the travel path.

The solution according to the invention offers several advantages over known picking devices. First of all, tilting of the at least one container holder towards the picking workstation is advantageous, since an operator can reach the container holder more easily. Therefore, on the one hand, picking can be carried out more quickly and, on the other hand, the health burden for the operator may decrease. A further advantage of the solution according to the invention is the fact that the tilt device is configured such that the container holder can be tilted toward the picking workstation due to the movement along the travel path. The at least one container holder therefore is tilted during the movement along the travel path. Traveling and tilting, therefore, can be carried out in one single movement. This can be substantially more time-saving than a serial sequence of traveling and tilting. In addition, manual tilting by the operator is not required.

The solution according to the invention can be further improved by means of different embodiments, which are individually advantageous and can be arbitrarily combined with one another. These embodiments and the advantages associated thereto are discussed in the following.

According to a first preferred embodiment, the tilt device may have a mechanical guidance for the at least one container holder along the travel path. The mechanical guidance can ensure a secure movement of the at least one container holder along the travel path. In addition, the mechanical guidance itself can tilt the at least one container holder during a movement along the travel path toward the at least one picking workstation.

The travel path for the at least one container holder is preferably self-contained and/or integrated. The travel path is in particular preferred circular and extends around a full circle. Thus, the at least one container holder can be moved to every desired position along the travel path, irrespective of whether a clockwise or counter-clockwise rotation takes place.

In order to guide the at least one container holder securely along the travel path, at least two container holders can be rigidly coupled with each other with respect to a displacement along the travel path. The tilting movements of the individual container holder are thereby preferably still possible. The at least one container holder then can be moved along the travel path and tilted by means of the tilt device, a displacement of the at least one container holder along a direction perpendicular to the travel path, however, is prevented.

In order to translate the tilting of the at least one container holder, which is caused by the movement of the at least one container holder along the travel path as simply as possible, the tilt device can have a forced guidance for the container holder, which triggers the tilting movement of the at least one container holder during a rotation of the rotation units.

If, for example, the tilt device has a mechanical guidance for the at least one container holder along the travel path, the at least one container holder can have at least two rollers, which are arranged on opposite sides of the mechanical guidance. The mechanical guidance may also be designed as a rail system, wherein suitable rollable counterparts can be provided on the at least one container holder, which are guidable through the rails. The forced guidance can simultaneously perform several tasks. Firstly, it can specify the travel path for the at least one container holder. Secondly, it can trigger the tilting movement of the at least one container holder or guide the container holder to a tilting movement. Furthermore, the forced guidance can ensure the inflexibility so that the at least one container holder can move along the travel path and thereby, can be tilted, however, other movements are prevented. The forced guidance can be achieved particularly simply, if the container holder has at least two vertically opposing rollers, between which a mechanical guidance is arranged.

In order to define the tilting movement of the at least one container holder in a reproducible manner, a cam control for generating the tilting movement of the at least one container holder can be provided along the travel path. The cam control may in particular be part of the tilt device. The cam control is preferably formed by the forced guidance. At least one container holder, for example, can be mechanically engaged with the cam control.

The at least one container holder can have a tilting axis, which is spaced apart from the mechanical guidance of the tilt device. Preferably, the mechanical guidance is horizontally spaced apart from the tilting axis. If the mechanical guidance then changes its position relative to the tilting axis, the at least one container holder can follow this change in position by tilting the container holder about the tilting axis.

A particularly compact design of the picking device according to the invention can be obtained by arranging the tilting axis of the at least one container holder in the central area of the container holder. The tilt device can then be arranged at a peripheral area of the container holder, which is spaced apart from the central area of the container holder. If the at least one container holder, for example has rollers, which are connected to a mechanical guidance, the rollers can be arranged at an outer side of the at least one container holder. The arrangement of the tilting axis in the central area of the container holder also ensures an advantageous balance of the at least one container holder, in particular if it is heavily loaded. The at least one container holder is particularly preferred held in the region of the tilting axis at the remaining picking device.

A particularly simply assembled picking device can be obtained due to the fact that a vertical position of the tilting axis is invariable during a movement of the container holder along the travel path. The tilting axis, thus, can be moved along a horizontal plane during a rotation of the rotation unit, while the tilt device can tilt the at least one container holder about the tilting axis. If the picking device has a mechanical guidance and is spaced apart from the tilting axis, the change of the distance between the mechanical guidance and the tilting axis along the travel path determines the extent of the tilting of the at least one container holder. Preferably, the tilting axis is spaced apart from the mechanical guidance. Then, the vertical position of the tilting axis relative to the guide determines the extent of the tilting.

In order to form a picking device according to the invention particularly simply, the at least one container holder can be held tiltably by a rotary table of the rotation unit. The rotary table can in particular have a vertical axis of rotation so that the tilting axis of the at least one container holder always remains at the same height, also during a rotation of the rotation unit or the rotary table. In order to form the picking device particularly compactly, a mechanical guidance of the tilt device may be arranged below the rotary table. If the picking device has two container holders, their tilting axes are preferably arranged parallel to each other and on opposite sides of the vertical axis of the rotary table. If the picking device has more than one container holder, the tilting axes of all container holders are preferably arranged on the same height.

In order to form a mechanical guidance as simple as possible and in order to keep the tilting of the at least one container holder consistently along the travel path, the mechanical guidance can be aligned at least in sections along an inclined plane.

In order to adjust the extent of the tilting of the at least one container holder for different requirements, an adjusting mechanism can be provided, by means of which inclination of the inclined plane is adjustable.

In order to obtain a mechanical guidance, which is assembled particularly simply, the mechanical guidance can be belt-shaped or disk-shaped, wherein the flat sides of the mechanical guidance are essentially aligned horizontally. Thereby, essentially horizontally shall mean with the exception of an inclined position or inclined sections for generating the tilting movement of the at least one container holder.

If the at least one container holder has rollers, the mechanical guidance can form a track for the rollers. Preferably, at least two rollers are provided, one of which is arranged above and one below the guide, respectively. The tracks formed by the mechanical guidance are preferably uninterrupted so that even tracks are formed for the rollers.

The guide may in particular be formed by an annular disk, the flat sides of which are aligned along an inclined plane. Parts of the rotation unit can protrude through the opening of the annular disk.

The picking device can have at least two container holders. This is in particular advantageous, since one of the at least two container holders can take a position at the picking workstation so that an operator can pick the content of a container held in the container holder, while the second container holder faces the placement point so that an exchange of goods or containers can occur by the automatic placement point. If the picking device according to the invention has two container holders, these are preferably arranged on two opposing sides of the rotation unit, wherein a vertical axis of the rotation unit preferably is arranged between the two container holders.

The picking device may also have more than two container holders. In this way, more than one placement points can be arranged on the picking device. Moreover, it is possible that transport devices for containers are provided, which, in addition to the at least one placement point and the at least one picking workstation can be connected to the picking device so that containers with a container holder, which are not arranged at the at least one placement point or the at least one picking workstation, are moved by the picking device on the transport device, or that containers are moved from at least one transport device on a container holder, while further container holders are positioned at the at least one placement point and/or at the at least one picking workstation.

In order to increase the safety for an operator and to avoid malfunctions of the picking device, a housing can be provided, which only allows access to a container held in the container holder through an access opening in the area of the picking workstation.

The housing can have a trigger device for stopping the at least one container holder, wherein the trigger device has at least one alarm transmitter in the form of a sensor arrangement, which monitors the trigger area. The trigger area can comprise at least one periphery of the access opening. A movement within the access opening or an undesired penetration of an object into the access opening can be detected in the trigger area. The alarm transmitter can generate a stop signal for stopping the rotation unit. By means of the trigger device, it shall in particular be prevented that a hand of the operator is caught in between the container holder or a container held in the container holder and the housing.

In order to obtain a particularly simply assembled trigger device, the at least one trigger device can have at least one slidable alarm transmitter. If an object, such as a hand, reaches between the slidable alarm transmitter and a container holder or a container held in the container holder, the movement of the container holder can press the object against the slidable alarm transmitter during a movement along the travel path. Thereby, the slidable alarm transmitter is displaced and a stop signal can be generated by the trigger device.

The slidable alarm transmitter preferably is configured as a frame surrounding the access opening. The frame then covers the trigger area. Alternatively thereto, a light barrier can also be provided in the peripheries of the access opening, which can detect an object in the access opening.

Alternatively or in addition, a light grid can be provided below the access opening, which can detect the penetration of an object into the access opening, if no container holder is arranged below the access opening.

In order to prevent erroneous triggering of the trigger device, a light grid can be switched off below the container holder, if the container holder is arranged below the access opening or just takes the position below the access opening. Then, in this state, only the slidable alarm transmitter is active, if available.

Besides the picking device of the type described above, the invention relates to a storage system with at least one automatic placement point and at least one picking workstation, characterized in that the storage system has a picking device of the type described above between the at least one automatic placement point and the at least one picking workstation.

In the following, the invention is described in more detail by means of preferred embodiments with reference to the drawings. The feature combinations exemplarily shown in the embodiments can be supplemented by further features according to the above explanations for a particular application. It is also possible in accordance with the above explanations, to omit individual features in the described embodiments, if the effect of this feature is irrelevant for a specific application.

BRIEF DESCRIPTION OF THE DRAWINGS

In the drawings, the same reference signs are used for elements of the same function and/or the same structure. Therein

DETAILED DESCRIPTION

Figure 1:
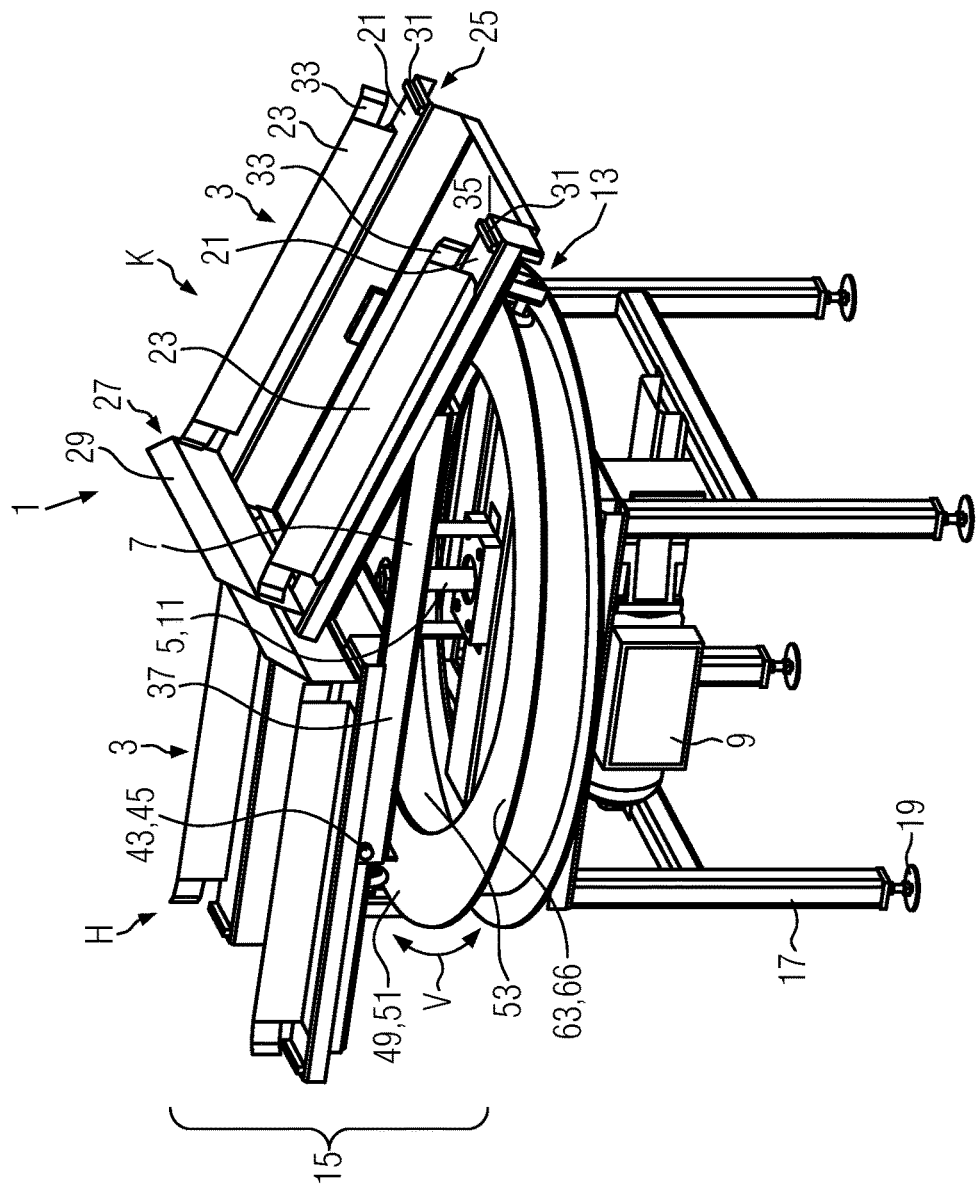
FIG. 1 shows a perspective illustration of an embodiment of the picking device according to the invention.

FIG. 1 shows a perspective view of a picking device 1 according to the invention. The illustrated embodiment of the picking device 1 according to the invention has two container holders 3. The embodiment with two container holders 3 is only exemplary. The picking device 1 according to the invention may also have only one single container holder 3 or several container holders 3.

The container holders 3 are movable along the travel path V. They can be moved by means of the rotation unit 5. The rotation unit 5 can have a rotary table 7, which holds the two container holders 3. A drive unit 9, which can be formed, for example, by an electric motor and which is particularly preferred arranged below the rotary table 7, may also be part of the rotation unit 5. The rotary table 7 is preferably arranged on a vertical axis 11 of the rotary table, which is connected to the drive unit 9. The connection of the rotary table axis 11 and the drive unit 9 may be effected rigidly or via a gear.

The picking device 1 has a tilt device 13 for the container holders 3. The tilt device serves to tilt the container holders 3 during a movement along the travel path V. In FIG. 1, one of the container holders 3 is shown in a non-tilted, horizontal position H and the second container holder 3 in a tilted position K. The picking device 1 is preferably arranged such that the horizontal position H is assumed on one side of the picking device 1, which faces an automatic placement point, and the tilted position K is assumed on a side, at which a picking workstation is arranged. In the tilted position K, the container holder 3 or a container indicated therein (not shown) is particularly easy accessible for an operator. Therefore, the time for picking can be reduced and possible health risks for the operator can be minimized.

The picking device 1 with the rotation unit 5, the rotary table 7, the container holders 3, and the tilt device 13 preferably altogether form a structural unit 15. The structural unit 15 can be manufactured separately and can also be subsequently retrofitted regarding storage systems. In addition, the structural unit 15 may be configured to be transportable. The drive unit 9 may also be part of the structural unit 15. The components of the structural unit 15 may be arranged on a rack 17 and may be supported thereon. As shown in FIG. 1, the rack 17 can have feet 19. This, however, is only exemplarily illustrated. Alternatively thereto, the rack 17 can also be placed on roller elements in order to be able to rapidly change the position of the picking device 1. It is further possible that the picking device 1 is mounted on an existing part of the storage system, for example, the placement point.

In the following, the structure of the container holder 3 with reference to the container holder 3 shown in FIG. 1 in the tilted position K is described. The container holder 3 has two support rails 21, which are spaced apart from each other and which serve to support one container. However, for the lateral guidance of a container, each support rail is connected to a guide rail 23. The guide rails 23, thereby, are mounted to the outer ends of the support rails 21 so that the support rails 21 are not concealed by the guide rails 23. Each container holder 3 has an access-side end 25 and a rear end 27. At the access-side end 25, containers can be inserted into the container holder 3 and removed therefrom. The access-side end 25, therefore, is designed openly. At the rear end 27, the container holder 3 has a rear wall 29, which can prevent a movement of the container beyond the rear end 27.

In order to prevent slipping of the container from the support rails, in particular in the tilted position K, each support rail has an arrester 31 at its access-side end 25. The arresters 31 are designed such that a container can be lifted easily beyond the arresters 31, when it is inserted into the container holder 3 and when it is removed therefrom.

For a facilitated insertion of a container into the container holder 3, the guide rails 23 have guide members 33, which are forced apart from the container holder 3 toward the access-side end 25. The two guide members 33 at the access-side end are arranged opposite one another. Thus, a container can be received by the guide members 33 when inserted into the container holder and guided to the guide rails 23.

The guide rails 23 preferably also have guide members 33 at the rear end 27. In the mounted state, these guide members 33 then do not fulfill any function. However, the guide rails 23 can be produced such that they can be used on both sides of the container holder 3. The manufacturing of guide rails 23, which respectively fit only on one side of the container holder 3, may therefore be dispensed with.

In an inserted state, a container in the container holder 3 is preferably held laterally from the guide rails 23 by the rear wall 29 and on an underside by the support rails 21. Thereby, it is possible to prevent a container from slipping out of the container holder 3 during a movement of the container holder 3 along the travel path and during a tilting.

In order to insert a container particularly easily into a container holder 3 or to remove it therefrom, in particular at an automatic placement point, the container holder 3 has an underride chamber 35. The underride chamber 35 is arranged below the support rails 21 and is open toward the access-side end 25 of the container holder 3. The underride chamber 35 allows the support devices, as e.g. teeth or rails of an automatic placement point or a transport device to penetrate into the container holder 3 in order to deposit a container on the support rails 21 or to lift it therefrom.

Figure 2:
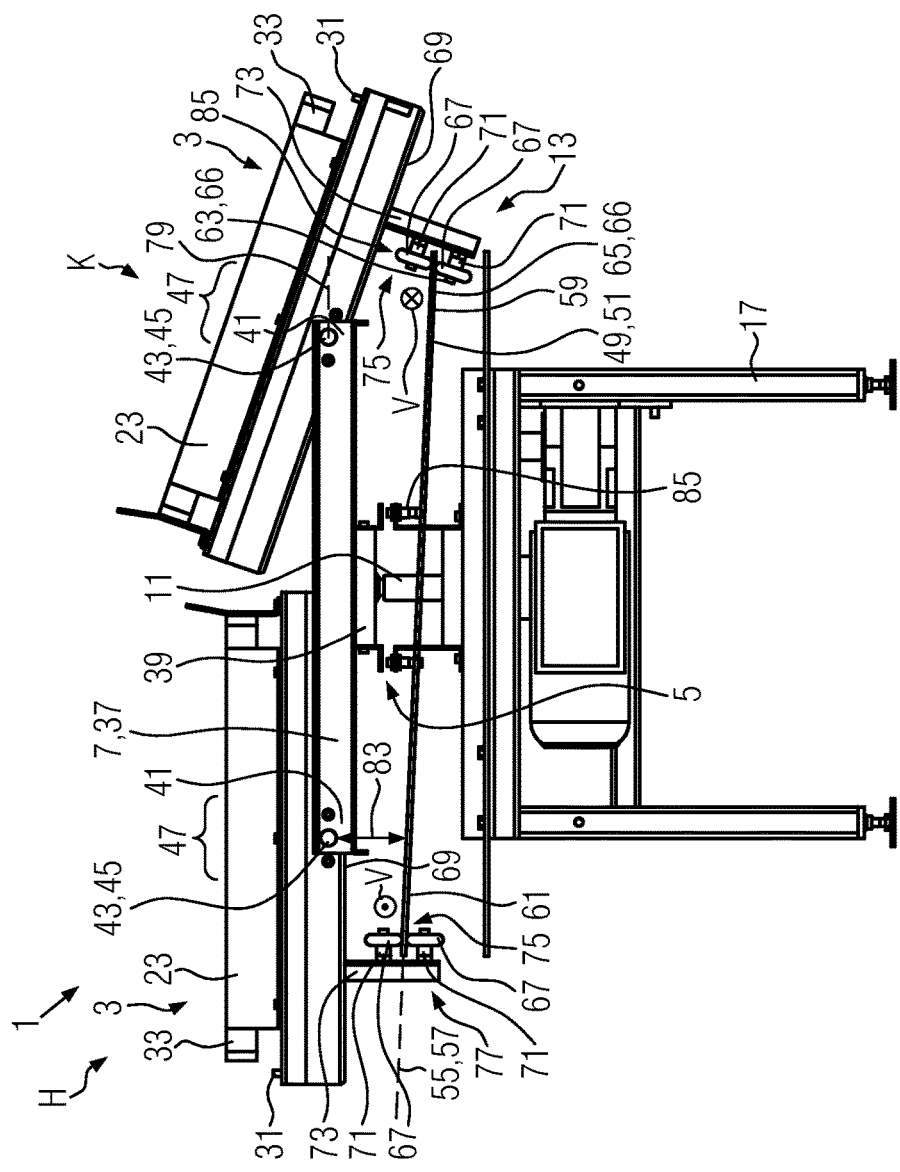
FIG. 2 shows a side view of the embodiment shown in FIG. 1.

In the following, the structure of the tilt device 13 and further elements of the picking device 1 with reference to FIGS. 1 and 2 are described in more detail. The rotary table 7 of the rotation unit 5 has the horizontal supports 37. The horizontal supports 37 essentially form the rotary table 7. The horizontal supports 37 are spaced apart from one another and are connected centrally to the rotary table axis 11. For the connection to the rotary table axis 11, the rotary table 7 has a transverse beam 39, which is directly connected to the rotary table axis 11 and on which the horizontal supports 37 are arranged. At their ends 41, the horizontal supports 37 have support devices 43 for the container holders 3. The support devices 43 support the container holders 3.

The container holders 3 are tiltably connected to the horizontal supports 37 via the support devices 43. The support devices 43 preferably coincide with the tilting axes 45 of the container holders 3. The tilting axes 45 or the support devices 43 are preferably arranged in the central areas 47 of the container holders 3. Thereby, a large part of the load of the container holders 3 and the containers contained therein can be absorbed by the rotary table 7 via the support device 43.

By means of the tilt device, the container holders 3 are tiltable towards a picking workstation (not shown) during a movement along the travel path V. In the tilted state, the container holder 3 assumes the tilted position K. The tilt device 13 has a mechanical guidance 49. The mechanical guidance 49 is preferably formed by an annular disk 51. The annular disk 51 has a disk opening 53. The rotation unit 5 can project through the disk opening 53, in particular with the rotary table axis 11.

The annular disk 51 spans an annular disk plane 55, which essentially runs horizontally, however, thereby is arranged inclined such that it forms an inclined plane 57. In a state, in which the picking device 1 is arranged between a placement point and a picking workstation, the vertically lower end 59 of the annular disk 51 preferably faces the picking workstation and the vertically higher end 61 the automatic placement point.

As an alternative to the embodiment as an annular disk 51, the annular disk plane 55 forms an inclined plane 57, other embodiments of the mechanical guidance are also possible. For example, the mechanical guidance 49 may also consist of an annular disk, which is horizontally aligned in a region, in which a container holder 3 shall be able to view the horizontal position H, and only in the region, in which the at least one container holder 3 shall assume the tilted position K, deviates from the horizontal position. It is also possible that the mechanical guidance 49 is formed by a rail system.

The mechanical guidance 49 is preferably formed consistently and evenly along the travel path V. The mechanical guidance 49 forms an upper track 63 and a lower track 56 for the rollers 67. If the mechanical guidance 49 is formed by an annular disk 51, the flat sides 66 of the annular disk 51 form the tracks 63 and 65. The rollers 67 are rotatably held on the container holders 3. Each container holder 3 preferably has at least two rollers 67. The rollers 67 are arranged on undersides 69 of the container holders 3. The rollers 67 are respectively spaced apart horizontally from the tilting axes 45 of the container holders 3. In a horizontal direction, they lie further spaced apart from the rotary table axis 11 than the tilting axes 45. The rollers 67 are preferably arranged on the respective container holders 3 such that their roller rotary axes 71 run parallel to the underside 69 and face the direction of the rotary table axis 11. The roller rotary axes 71 are preferably held on booms 73 on the undersides 69 of the container holders 3 and are spaced apart therefrom from the undersides 69.

Each container holder 3 preferably has at least one pair 75 of rollers 67, wherein respectively, one roller 67 of one pair of rollers 75 is arranged above and one roller 67 below the mechanical guidance 49. Therefore, the mechanical guidance 49 is arranged between two rollers 67 of a pair of rollers 75. Preferably, the two rollers 67 of a pair of rollers 75 thereby lie vertically opposite one another. Alternatively thereto, a container holder 3 can also have a system consisting of three rollers, two rollers each being arranged above or below the mechanical guidance 49, and a third roller on the vertically opposite side of the mechanical guidance 49. However, preferably, each container holder 3 has two pairs of rollers 75.

In the following, the function of the picking device 1 according to the invention is described. If a container holder 3 is arranged in the horizontal position H and moved along the travel path V by a rotation of the rotation unit 5, the rollers 67 of the container holder move along the upper track 63 and the lower track 65. Since the mechanical guidance 49 is arranged between the rollers 67, the rollers 67 follow the course of the mechanical guidance 49.

The system of rollers 67 and mechanical guidance 49 forms a forced guidance 77 of the tilt device 13. Since the mechanical guidance 49 runs along an inclined plane 57, the vertical position 79 of the tilting axes 49, however, remains unchanged, because the horizontal support 37 of the rotary table 7 remain in their horizontal plane during a rotation of the rotation unit 5, a tension is applied to the container holder 3, when the rollers 67 are moved along the travel path V in the direction of the vertically lower end 59. This vertically downward tension on the container holder 3 is compensated due to the fact that the container holder 3 follows the mechanical guidance by being tilted downwards about the tilting axis 45. A rotation in the opposite direction leads to the fact that the container holder 3 is moved back into the horizontal position H again. A movement along the travel path V moves the container holder 3 at the vertically higher end 61 of the mechanical guidance 49, thus, into the horizontal position H and at the vertically lower end 59 into the tilted position K.

In order to achieve tilted positions K and/or horizontal positions H at several points of the travel path V, the mechanical guidance 49 can also have a curved course, instead of an even course so that the container holder 3 follows this curved course during a movement along the travel path V.

In summary, it can thus be said that the tilt device 13 constitutes a cam control 81 for the tilting of the at least one container holder 3. Thereby, the vertical distance 83 between the mechanical guidance 49 and the tilting axis 45 determines the extent of the tilting of the container holder 3. In order to be able to quickly adjust the extent of the tilting of the container holder 3, the mechanical guidance 49 can have an adjusting mechanism 85, by means of which the inclined position of the inclined plane 57 can be varied. The adjusting mechanism 85 can, for example, be formed by adjusting screws.

Since the rollers 67 also tilt on the tracks 63 and 65 during the tilting of the container holder 3, the rollers 67 preferably have rounded profiles 87. In order to make the picking device 1 compactly, the mechanical guidance 49 is arranged below the container holders 3.

Figure 4:
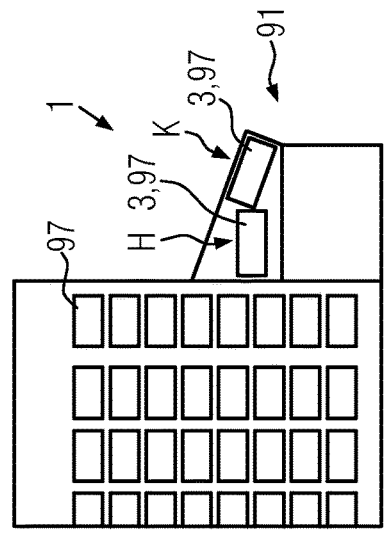
FIG. 4 shows a side view of the storage system of FIG. 3.
Figure 3:
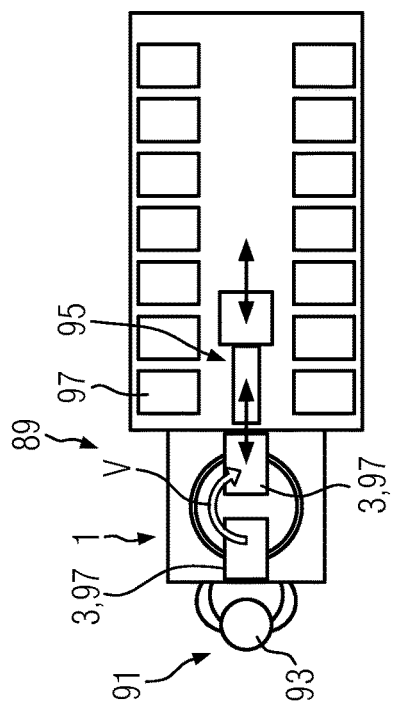
FIG. 3 shows an application example of a picking device according to the invention in a storage system according to the invention.

FIG. 3 schematically shows the top view of a first embodiment of the storage system 89 according to the invention and FIG. 4 a schematic side view of the same embodiment. A picking workstation 91 and an automatic placement point 95 are part of the storage system 89 for at least one operator 93. The automatic placement point 95 may be part of a rack lift system. The picking device 1 is arranged between the automatic placement point 95 and the picking workstation 91.

In the first shown embodiment, the picking device 1 according to the invention has two container holders 3, which are illustrated with respectively inserted containers 97. An advantage of the picking device 1 according to the invention or of the storage system 89 according to the invention, is that the operator 93 can access a container 97 at the picking workstation 91, while the second container 97 is placed by the placement point 95. At the same time, the tilt device leads to the fact that the container 97 facing the picking workstation 91 is tilted towards the picking workstation 91 for an easier access by the operator 93. In contrast, the container 97, which faces the placement point 95 is aligned horizontally so that the automatic placement point 95 can easily remove the container 97 from the container holder 3 and replace it with a new container 97.

Figure 5:
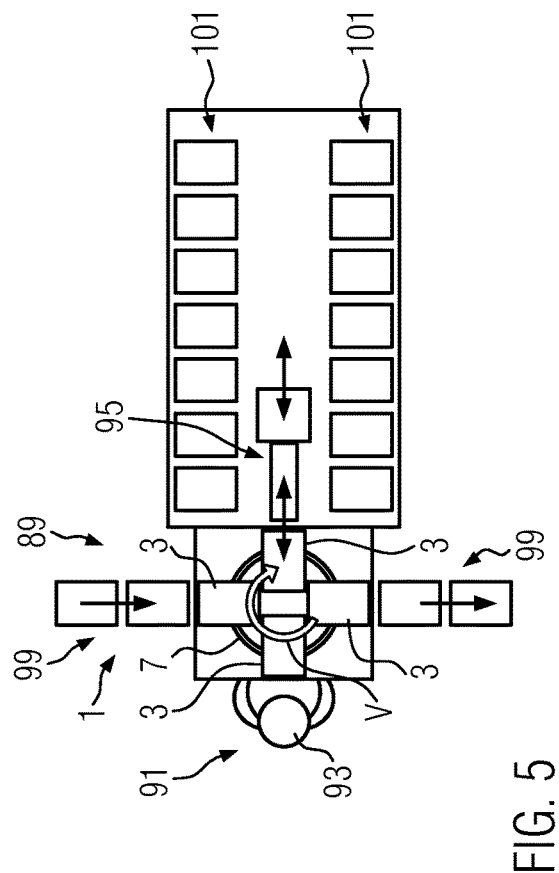
FIG. 5 shows a storage system with a second embodiment of the picking device according to the invention.

FIG. 5 shows a second embodiment of a storage system 89 according to the invention with a second embodiment of the picking device 1 according to the invention. The second embodiment of the picking device 1 has four container holders 3. The four container holders 3 are arranged crosswise on a rotary table 7 of the picking device 1. In addition, the storage system 89 of the second embodiment has two transport devices 99, which in addition to the picking workstation 91 and the automatic placement point 95, are connected to the picking device 1. The second embodiment may be used to move containers 97 not only between the picking workstation 91 and the placement point 95, but also to move containers from a transport device 99 onto a free container holder 3 or to move them away therefrom.

A possible application could be as follows: new containers with goods are fed to the picking device 1 via one of the transport devices 99 and are placed on a free container holder 3. A rotation of the rotation unit 5 of the picking device 1 can move this new container 97 to the placement point 95. The placement point 95 then can store this new container into the rack system until the content of the container 97 is needed. As in the case of the first embodiment, by means of the placement point 95, for picking, containers 97 can be placed on a free container holder 3 in order to move them to the picking workstation 91. The content of a container can then be picked by the operator 93. A completely picked container 97 or, for example, an empty container 97, can then be transported away from one of the transport devices 99. Due to the configuration with the additional transport devices 99, the greatest possible flexibility in managing of goods and in picking is provided.

Alternatively thereto, the storage system 89 can also have only one transport device 99 or more than two transport devices 99. The picking device 1, as well, can have an arbitrary number of container holders 3.

Figure 6:
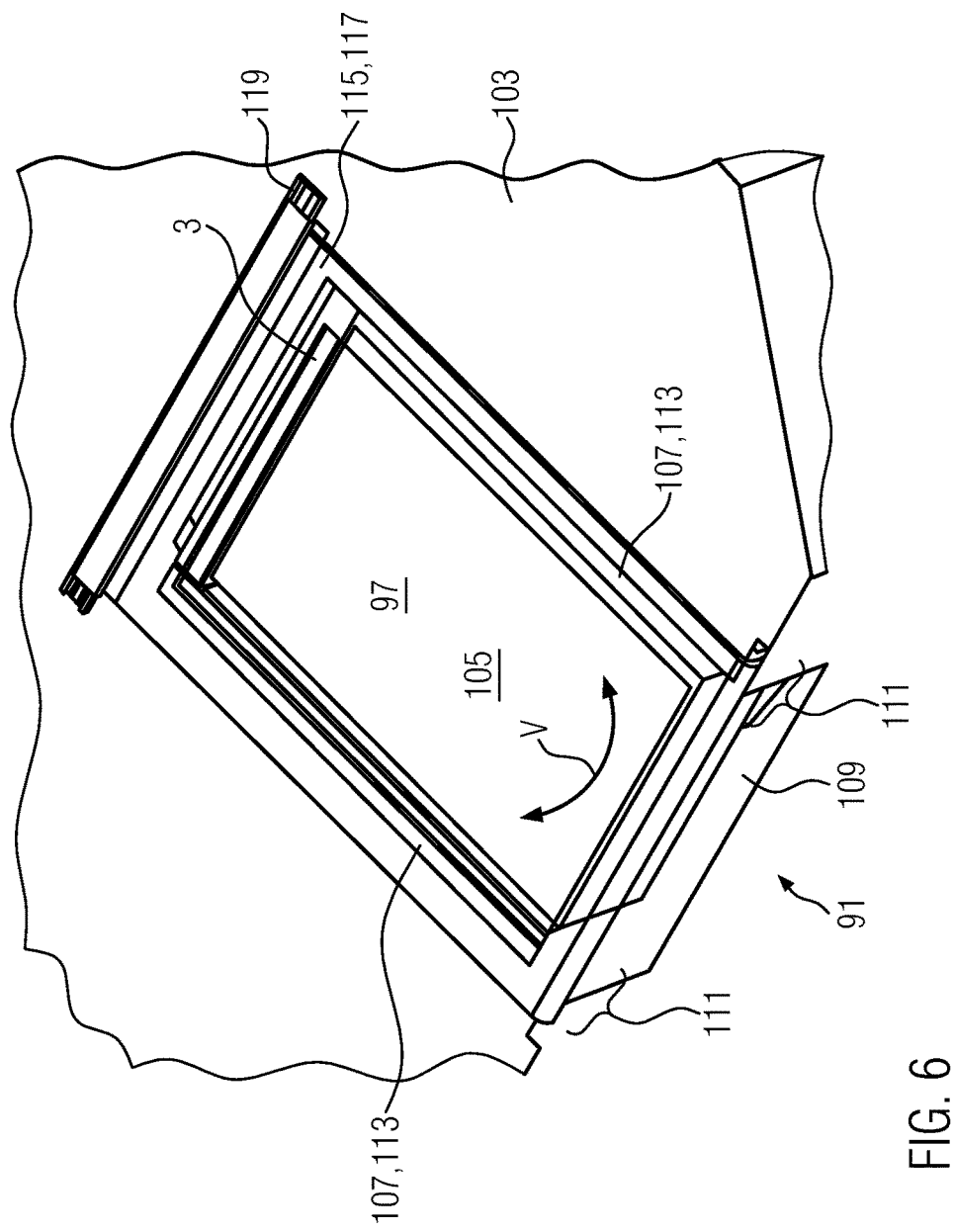
FIG. 6 shows a perspective illustration of a part of the housing according to the invention in the area of the opening access.

FIG. 6 shows a section of a housing 103 according to the invention. The housing can surround the components of the picking device 1, in particular the rotary table 7 at least in sections with the container holders 3 so that only in the area of the picking workstation 91, an access to container 97 held in the container holder 3 is possible. For this, the housing 103 has an access opening 105. The housing 103 can increase the safety for an operator (not shown), since an access to the movable parts of the picking device 1 is prevented. In the region of the access opening 105, however, an access to the interior of the housing 103 is possible.

In order to reduce the risk of injuries to an operator when reaching into the access opening 105, for example, by a hand caught in between a moving container 97 or a container holder 3 and the housing periphery 107, the housing 103 has a trigger device 109. For this, the trigger device 109 is configured to generate a stop signal for stopping the at least one container holder 3. For this, the trigger device 109 can have a control and monitoring unit (not shown). The stop signal can in particular stop the rotation of the rotation unit 5.

The trigger device 109 has two trigger areas 111 at the lateral peripheries 113 of the access opening 105. Within the trigger areas 111, it can be detected if an object, as for example a hand is arranged between an arriving container 97 and the periphery 113 of the access opening or the housing periphery 107. The trigger area 111 can, for example be scanned by means of a light barrier.

A slidable alarm transmitter 115 is preferably arranged in the trigger area 111. The alarm transmitter 115 is preferably configured as a frame 117, which surrounds the periphery 113 of the access opening 105. The frame 117 is slidably held in a rail 119, which runs tangentially to the travel path V. For example, if an object falls into the access opening 105 before a container holder 3 has assumed its position below the access opening 105 and if then the container holder 3 is moved along the travel path V in the direction of the picking workstation 91, an object arranged in the access opening, such as for example a hand, is displaced by means of the container holder 3 in the direction of the periphery 113 of the access opening. If the object then encounters the slidable alarm transmitter 115 or the frame 117, the movable frame 117 is moved along the rail 119. This movement can be detected by the trigger device to generate the stop signal. A further advantage of using a slidable frame 117 is that the frame 117, as long as the container holder 3 still displaces the object located in the access opening 105, moves with it. Thereby, it is prevented that an object is caught in directly between the housing periphery 107 and the container holder 3.

REFERENCE SIGN LIST 1 picking device
3 container holder
5 rotation unit
7 rotary table
9 drive unit
11 rotary table axis
13 tilt device
15 structural unit
17 rack
19 feet
21 support rail
23 guide rail 25 access-side end
27 rear end
29 rear wall
31 arrester
33 guide member
35 underride chamber
37 horizontal support
39 transverse beam
41 end
43 support device
45 tilting axis
47 central area
49 mechanical guidance
51 annular disk
53 disk opening
55 annular disk plane
57 inclined plane
59 vertically lower end
61 vertically higher end
63 upper track
65 lower track
66 flat sides
67 rollers
69 underside
71 roller rotary axis
73 boom
75 pair of rollers
77 forced guidance
79 vertical position
81 cam control
83 vertical distance
85 adjusting mechanism
87 roller profiles
89 storage system
91 picking workstation
93 operator
95 placement point
97 container
99 transport device
101 rack system
103 housing
105 access opening
107 housing periphery
109 trigger device
111 trigger area
113 periphery
115 alarm transmitter
117 frame
119 rail
H horizontal position
K tilted position
V travel path

The invention claimed is:

1. A picking device for arranging between at least one automatic placement point and at least one picking workstation, comprising at least one container holder movable along a self-contained travel path from the at least one picking workstation to the at least one placement point, and comprising a rotation unit for moving the at least one container holder along the travel path, wherein the picking device has a tilt device for the at least one container holder, by means of which the at least one container holder can be tilted toward the at least one picking workstation during a movement along the travel path, wherein the tilt device has a mechanical guidance for the at least one container holder along the travel path, wherein the at least one container holder has a tilting axis, which is spaced apart from the mechanical guidance, wherein a vertical position of the tilting axis remains unchanged during a movement of the container holder along the travel path, and wherein the tilt device further has a forced guidance for the at least one container holder, the forced guidance specifying the travel path and being configured to trigger the tilting of the at least one container holder toward the at least one picking workstation.

2. Picking device according to claim 1, wherein at least two container holders are rigidly coupled with one another with respect to a displacement along the travel path.

3. The picking device according to claim 1, wherein the forced guidance is configured to trigger the tilting of the at least one container holder during a rotation of the rotation unit.

4. The picking device according to claim 1, wherein along the travel path, a cam control is provided to generate the tilting movement of the at least one container holder.

5. The picking device according to claim 1, wherein the mechanical guidance is at least in sections aligned along an inclined plane.

6. The picking device according to claim 1, wherein at least two container holders are provided.

7. The picking device according to claim 1, wherein a housing is provided, which allows access to one of the containers held in the container holder through an access opening only in the area of the picking workstation.

8. The picking device according to claim 7, wherein the housing has a trigger device to stop the at least one container holder, wherein the trigger device has at least one alarm transmitter in the form of a sensor unit, which monitors the at least one trigger area at at least one periphery of the access opening.

9. The picking device according to claim 8, wherein the at least one trigger device has at least one slidable alarm transmitter.

10. A storage system with at least one automatic placement point and at least one picking workstation, wherein the storage system has one picking device according to claim 1 between the at least one automatic placement point and the at least one picking workstation.

11. A picking device for arranging between at least one automatic placement point and at least one picking workstation, comprising at least one container holder movable along a self-contained travel path from the at least one picking workstation to the at least one placement point, and comprising a rotation unit for moving the at least one container holder along the travel path, wherein the at least one container holder is tiltably held by a rotary table of the rotation unit, and wherein the picking device has a tilt device for the at least one container holder, by means of which the at least one container holder can be tilted toward the at least one picking workstation during a movement along the travel path, wherein the tilt device has a mechanical guidance for the at least one container holder along the travel path, and wherein the tilt device further has a forced guidance for the at least one container holder, the forced guidance specifying the travel path and being configured to trigger the tilting of the at least one container holder toward the at least one picking workstation.

12. A picking device for arranging between at least one automatic placement point and at least one picking workstation, comprising at least one container holder movable along a self-contained travel path from the at least one picking workstation to the at least one placement point, and comprising a rotation unit for moving the at least one container holder along the travel path, wherein the picking device has a tilt device for the at least one container holder, by means of which the at least one container holder can be tilted toward the at least one picking workstation during a movement along the travel path,
- wherein the tilt device has a mechanical guidance for the at least one container holder along the travel path,
- wherein the mechanical guidance is belt-shaped or disk-shaped, wherein the flat sides of the mechanical guidance are essentially aligned horizontally,
- and wherein the tilt device further has a forced guidance for the at least one container holder, the forced guidance specifying the travel path and being configured to trigger the tilting of the at least one container holder toward the at least one picking workstation.

* * * * *